United States Patent Office 3,631,000
Patented Dec. 28, 1971

3,631,000
ISOCYANURATE-CONTAINING POLYISOCYA-
NATES AND METHOD OF PREPARATION
Perry A. Argabright and Brian L. Phillips, Littleton, Colo.,
and Vernon J. Sinkey, South St. Paul, Minn., assignors
to Marathon Oil Company, Findlay, Ohio
No Drawing. Filed June 4, 1969, Ser. No. 830,541
Int. Cl. C08g 22/18, 22/44
U.S. Cl. 260—77.5 NC                                11 Claims

ABSTRACT OF THE DISCLOSURE

Improved organic polyisocyanates are prepared by reacting chlorinated benzene-substituted compounds, especially chloromethylated aromatics, with metal cyanates in the presence of a metal iodide or bromide and in the presence of a dipolar aprotic solvent where the mole ratio of cyanate in the metal cyanate to chlorine in the chlorine-containing benzene-substituted compound is from about 0.8 to about 1.5. The polyisocyanate compositions are useful as starting materials in the production of flame-retardant urethane polymers as coatings, films, foams, adhesives, etc.

CROSS REFERENCES TO RELATED APPLICATIONS

U.S. application Ser. No. 611,588 now U.S. Pat. 3,458,-448, filed Jan. 25, 1967, and assigned to the assignee of the present invention, relates to the preparation of polyisocyanate compositions similar to those of the present invention.

BACKGROUND OF THE INVENTION

Polyisocyanates, particularly tolylene diisocyanate (TDI), are widely used in the production of polyurethane polymers as coatings, films, foams, adhesives, and elastomers, for example. Urethane polymers offer advantages where superior resistance to abrasion, acid, alkali, and weather is required. Polyurethane foams are particularly suitable for thermal and sound insulation as well as resilience. Significant disadvantages of presently available urethane compositions are their tendency to degrade when exposed to sunlight, poor thermal stability, and flammable characteristics.

The present invention permits the production of new polyisocyanates in which the nitrogen of the isocyanate radical (—N=C=O) is not attached to an aromatic ring. It has been discovered that polymers derived from isocyanates having this special molecular characteristic are markedly more resistant to degradation and yellowing than are the polymers produced from conventional isocyanates in which the nitrogen of the isocyanate group is attached to an aromatic ring. These polyisocyanate product mixtures contain at least about 0.1 and preferably from 10 to about 75 mole percent (based on the total moles of nitrogen in composition) of isocyanurate groups which have been discovered to render additional thermal stability and resistance to degradation of finished polymers. It has also been observed that the incorporation of isocyanurate ring into a polymeric structure increases the flame retarding properties of the structure.

The polyisocyanate products of the present invention preferably have at least 0.5 and more preferably at least 2.0 milliequivalents free isocyanate content per gram of product.

SUMMARY OF THE INVENTION

We have found that superior isocyanurate-containing polyisocyanates are inexpensively prepared by the two-step process of: (1) chloroalkylating a mono-substituted benzene compound, and (2) reacting the polychloroalkylated benzene-substituted compounds with a metal cyanate in the conjoint presence of a bromide or iodide of an alkali metal or an alkaline earth metal, and in the presence of an aprotic solvent, herein defined. The mole ratio of metal cyanate to the chloride in the polychloroalkylated benzene-substituted compound is from about 0.8 to about 1.5 to produce the polyisocyanates. These polyisocyanate compositions are starting materials for various polymeric systems, e.g. a rigid polyurethane foam produced by conventional polymerization or copolymerization with an appropriate monomer (e.g. a polyester or polyether based polyol). Particularly preferred products are polyurethane and polyurea foams, coatings, elastomers and adhesives.

PREFERRED EMBODIMENTS OF THE INVENTION

The process and compositions of the present invention represent a significant improvement over the processes and compositions of the prior art and copending application Ser. No. 611,588. The principal advantages are realized when the chlorinated organic starting materials are chloroalkylated benzene-substituted compounds, especially polychloromethylated toluene. Further advantages are realized when mixtures of chloroalkylated benzene-substituted compounds are used as starting materials. The products of the present invention are superior to those of the prior art, less expensive to produce, and because of their improved solubility properties, are easier to handle, and may be charged in a continuous process for the preparation of polyurethanes.

Polyisocyanate product mixtures made in accordance with the present invention have a higher functionality than the current commercial products and when reacted with polyols produce urethanes of higher cross-link density than urethanes heretofore prepared. Furthermore, preparation of the polyurethanes requires shorter cure times. Another advantage which the urethane products possess is their higher thermal stability derived from the presence of diaryl methane groups (from about 1 to 25 mole percent) provided in the polyisocyanate product mixtures of the present invention.

Another advantage is realized, surprisingly, by the presence of a substituent, preferably a lower alkyl substituent, e.g. —$CH_3$, on the aromatic ring of the compound to be chloroalkylated. The presence of the substituent allows subsequent cyanation of the gross chloroalkylated product mixture to give superior polyisocyanate products. In contrast, chloroalkylation of benzene gives an undesirable mixture of products which must be separated before cyanation can suitably be commenced. The reason why the gross chloroalkylated product mixture of benzene is unsuitable for direct cyanation is not completely understood, but is believed to be due to an adverse steric effect of certain isomers in the mixture. Furthermore, these polyisocyanate products demonstrate low reactivity toward polyols and tend to function as chain stoppers in the reaction with polyols to form urethanes, a preferred embodiment of this invention.

Another advantage in using alkyl benzene starting materials lies in the ease of handling of crude chloroalkylated product mixtures. These products are liquid at room temperature. Chloralkylated benzene mixtures, however, such as those containing p-xylylene dichloride, are solid at room temperature. This distinguishing characteristic and its advantages become substantial when a continuous process is desired where fluidity of charge stock is important. Furthermore, the economics of such a continuous process are improved by using an alkyl-substituted benzene compound, such as toluene, rather than the more expensive benzene as a starting material. Other improvements and advantages of the invention will become apparent upon a reading of the specification.

The organic polychloride reactant is preferably obtained by chloroalkylating, preferably chloromethylating, a monosubstituted benzene compound. The only restriction placed on the substituent is that it must not interfere with either the chloromethylation reaction or the subsequent reaction with cyanate ion. Thus, in some cases, petroleum fractions may be suitable as feeds. The most preferred compounds include toluene, ethyl benzene, propyl benzene, and isopropyl benzene. Other monosubstituted benzenes useful in the instant invention include chlorobenzene, bromobenzene, biphenyl, bibenzyl, diphenyl ether and diphenyl methane.

The chloroalkylation of aromatics is well known in the art (see, for instance, Olah, Friedel-Crafts and Related Reactions, vol. 2, part 2, Interscience Publishers, New York, 1964, pp. 659–784) and involves basically the reaction of an aromatic hydrocarbon with an aldehyde (e.g. formaldehyde) or a suitable precursor, and hydrogen chloride in the presence of a catalyst such as a Lewis acid, or Friedel-Crafts type (e.g. zinc chloride). Thus, toluene, formaldehyde, and zinc chloride, along with a suitable solvent (e.g. ethylene dichloride) may be charged to a reactor with provision for stirring, and an inlet for continual flow of hydrogen chloride. The exothermic reaction causes a rise in temperature and is preferably maintained at from about 25 to about 200° C. and more preferably from about 50 to about 100° C. The reaction time is generally from about .1 to about 24 and more preferably from about .5 to about 12 hours. After the reaction is completed, the product is solvent extracted from the mixture, washed and dried. Pressure during the chloromethylation reaction is not narrowly critical and may range from less than atmospheric pressure to greater than 10,000 p.s.i.g.

Preferably, the gross chloromethylation product mixture is used in the present invention as the organic polychloride feed, providing that the chloromethylated product has an average of two or more chloromethyl groups per molecule. In some cases, it may be preferable to separate the gross chloromethylation product into components or aggregates of components by distillation, for instance, although use of the gross mixture is preferable because of its fluidity and ease of handling, product superiority, and economic advantages.

Although the organic polychloride starting materials are preferably prepared by a chloromethylation reaction, as described above, any method may be used so long as the chlorinated product has an average of at least two chlorine substituents per molecule which are not directly bonded to the nucleus of the aromatic ring. Preferably, the chlorines are bonded to lower alkyl hydrocarbon polyvalent radicals, especially methylene. Other methods for preparing the polyalkylchlorinated organic starting materials are well known in the art. For example, suitable starting materials are prepared by reacting toluene or xylene, for example, with molecular chlorine in the presence of ultra violet light or other free radical initiator. Various other methods of preparation of the starting materials may be utilized.

The metal cyanate is a cyanate of an alkali metal or alkaline earth metal where the metal may be lithium, sodium, potassium, rubidium, cesium, beryllium, magnesium, calcium, etc. Mixtures of these preferred metal cyanates may be used. The most preferred metal cyanates are sodium cyanate and potassium cyanate.

The catalyst used for the cyanation reaction is a metal bromide or iodide, preferably an alkaline earth or alkali metal bromide or iodide, exemplified by sodium bromide, potassium bromide, sodium iodide, and potassium iodide which are all readily soluble in the aprotic solvent systems, especially in preferred dimethylformamide (DMF). The metal cation of the catalyst may be the same or different from the metal cation of the metal cyanate. Using a catalyst such as sodium bromide is preferred because the by-product (sodium chloride) formed during the reaction is insoluble in the solvent (e.g. DMF) and separation from the product polyisocyanate is readily achieved by decantation, filtration, or by other well-known liquid-solid separation methods.

By aprotic solvents is meant compositions which are liquid under the conditions of the reaction, which have a high dielectric constant (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones (e.g. N-methyl pyrrolidone), N,N-dialkylamides (e.g. N,N-dimethylformamide (DMF) and N,N-dimethylacetamide), nitriles (e.g. acetonitrile), hexasubstituted phosphoramides (e.g. hexamethylphosphoramide), tetraalkylureas (e.g. tetramethylurea), sulfoxides (e.g. dimethylsulfoxide) and sulfones (e.g. phenyl sulfone), especially those in which substituents are alkyl groups, preferably methyl groups. The most preferred solvent for the reaction of this invention is DMF. Preferably, from about 0.05 to about 50 and more preferably from about 0.5 to about 10 liters of aprotic solvent will be present for each mole of chloromethyl group present.

The ratio of metal cyanate (MNCO) to chlorine in the organic polychloride reactant is preferably from 0.8 to about 1.5 and most preferably from 1.0 to about 1.1. The amount of metal bromide or iodide catalyst used will vary according to the isocyanate content desired in the product. For most isocyanates which are to be used in the production of urethane polymers, metal bromide or iodide catalyst ratios of from 0.02 to about 0.25 and more preferably 0.05 to about 0.15 mole of metal bromide or iodide per mole of chloroalkyl group in the polychloride will be used.

The cyanation reaction is preferably conducted at temperatures of from about 25 to about 300° and most preferably at from about 50 to about 105° C. Pressure is not narrowly critical and may be from below 1 atmosphere to over 10,000 p.s.i.g. In most cases it will be preferable to conduct the reaction in the absence of water on a batch-type basis, although flow systems with continuous inflow of reactants may be utilized. The most convenient apparatus will, in most cases, be a conventional tight lid varnish cooker or similar reactor having a reflux condenser, provisions for agitation, and the usual controls for temperature and pressure. The pressure of the reaction of course, will depend upon the vapor pressure of the solvent utilized, and the desired reaction temperature. The reaction time will depend on the nature of the polyisocyanate being prepared and may range from about 0.05 to about 24 hours. Generally, the reaction will take from about 0.1 to about 0.5 hour for the most preferred starting materials and reaction conditions.

As an example of the products produced by the method of the present invention, reaction of the product mixture produced by the chloromethylation of toluene with sodium cyanate in DMF and in the presence of sodium bromide gives a mixture of products, where a substantial portion of the products conform to the following structural formulae:

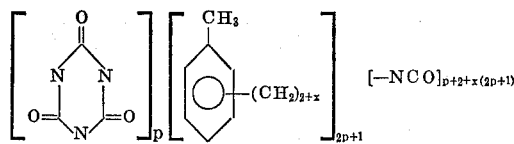

where there are no nitrogen to nitrogen bonds present and $p$ ranges from 0 to about 15, $x$ from 0 to about 2 such that the product of $x$ and $2p+1$ is an integer. As a specific illustration of particular components which may be present in this product mixture, the following are set forth for illustration:

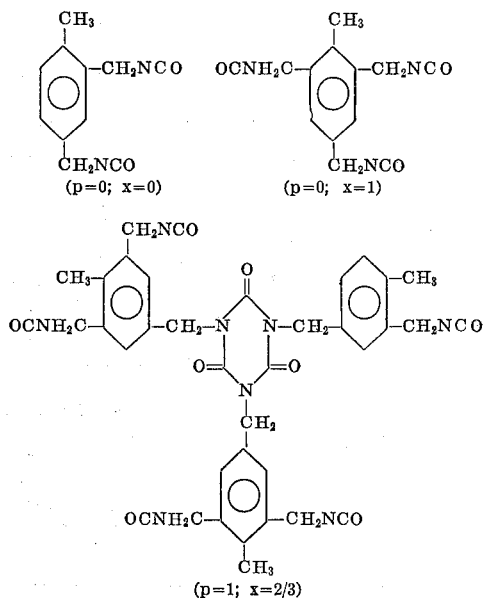

Exemplary are mixtures of organic polyisocyanates containing at least 0.5 milliequivalent of —NCO groups per gram of product mixture and having from about 0.1 to about 75 mole percent isocyanurate groups based on the total moles of nitrogen in the mixture, and from about 1 to about 25 percent of bis-tolyl methane groups based on the total number of moles of aromatic groups in the product.

The following examples are illustrative of preferred embodiments of this invention but are not meant to limit it in any way. A variety of modifications and variations will become obvious to those skilled in the art upon a reading of the present specification, and all such obvious variations and modifications are to be taken as being within the scope of the claims appended hereto.

EXAMPLE I

Anhydrous hydrogen chloride is passed into a stirred mixture of 1 mole of toluene, 2.3 moles of formaldehyde (charged as paraformaldehyde), 0.65 mole of zinc chloride (fused), and 360 ml. of ethylene dichloride. The exothermic reaction causes the temperature to rise to 70° C. This temperature is maintained by heating when necessary for a period of 3 hours. A constant flow of hydrogen chloride is maintained throughout this period. A small sample of the organic layer is removed from the cooled reaction mixture. Analysis of this aliquot shows no toluene remaining.

The aqueous phase is separated from the reaction mixture and is extracted with 100 ml. of ethylene dichloride which is then combined with the organic layer from the reaction mixture. This organic layer is washed with 1 portion of 200 ml. of water, 2 portions of 200 ml. of 5% aqueous sodium bicarbonate, and 1 portion of 200 ml. of water. The washed product solution is dried over anhydrous magnesium sulfate and filtered. The solvent is removed on a flash evaporator at 35° C. and 20 mm. Hg. The residue is a light-yellow oil, 186.6 g. The oil is taken up in benzene and treated with a decolorizing clay (Montmorillonite K20M). The product recovered by distilling off the benzene is a colorless oil. Elemental analysis indicates this product contains 32.65% chlorine. The presence of di-tolylmethane groups was confirmed by mass spectral analysis.

A mixture of 35 g. of the above chloromethylation product, 21.9 g. of sodium cyanate, 4.96 g. of sodium bromide, and 200 ml. of anhydrous dimethylformamide (DMF) is held at reflux for 10 minutes in a nitrogen atmosphere. The mixture is cooled immediately and filtered. The DMF is removed from the filtrate in vacuo with a flash evaporator leaving an oil. The oil is taken up in benzene and the insoluble salts filtered off. Removal of the benzene left an oil containing 5.51 meq./g. of free isocyanate groups. Infared spectroscopy confirms the presence of isocyanurate groups.

EXAMPLE II

According to the procedure of Example I, 1 mole of toluene, 3 moles of formaldehyde (charged as paraformaldehyde), 0.62 mole of zinc chloride, and 200 ml. of n-heptane are held at 55° C. for 4 hours with a constant flow of anhydrous hydrogen chloride being maintained. The chloromethylation product contains 37.28% chlorine.

A mixture of 35 g. of this product, 23.8 g. of sodium cyanate, 5.67 g. of sodium bromide, and 200 ml. of anhydrous DMF is held at reflux for 10 minutes in a nitrogen atmosphere. The product, isolated as in Example I, is an oil containing 6.1 meq./g. of free isocyanate groups. The IR spectrum shows that isocyanaurate groups are present.

The following Examples III–IV compare the cyanation products obtained from a chloromethylated benzene feed and a chloromethylated toluene feed. The product of Example III is a substantially insoluble resin which requires a separation of the product mixture before a suitable polyisocyanate can be isolated for further use in urethane production. In contrast, the total product mixture derived from toluene of Example IV is obtained in high yields and is suitable for further use in the production of polyurethanes, without further purification. Significantly, the products from toluene contain more free isocyanate groups per gram of product.

EXAMPLE III

Benzene is chloromethylated (by the general procedure of Example I) to obtain a gross reaction product containing 16.5% α,α'-dichloro-o-xylene and 62.1% α,α'-dichloro m- and p-xylenes. The product is decolorized with charcoal and then analyzed for chlorine, finding 39.19%.

A charge of 36.2 g. (0.4 g.-atom Cl) of the chloromethylated benzene product (vide supra 27.7 g. (0.43 mole) sodium cyanate, 6.18 g. (0.06 mole) sodium bromide, and 200 ml. DMF is held at reflux under $N_2$ for 20 minutes and cooled immediately. The reaction mixture is filtered and the DMF is distilled from the filtrate (in vacuo) leaving a brown residue. The residue is extracted with 50/50 (vol./vol.) methyl ethyl ketone-benzene and 19.3 g. of a viscous resin is obtained upon concentrating the extract. Quantitative infrared analysis shows the resin contains 3.4 meq./g. of free isocyanate groups. The material which is insoluble in the methyl ethyl ketone-benzene does not redissolve in DMF.

EXAMPLE IV

One mole of toluene is chloromethylated (by the general procedure of Example I) to obtain a mixture containing 0.054 mole mono(chloromethyl) toluenes and 0.72 mole di(chloromethyl) toluenes with the remainder of the toluene being converted to tri(chloromethyl)toluenes and ditolylmethane derivatives. The chloromethylation product contains 34.4% chlorine.

A mixture of 35 g. (0.34 mole Cl) of the above chloromethylation product, 23.2 g. (0.36 mole) sodium cyanate, 5.3 g. (0.05 mole) sodium bromide, and 200 ml. DMF is stirred at reflux under $N_2$ for 20 minutes and then cooled immediately. The reaction mixture is filtered, the DMF distilled from the filtrate in vacuo, and the resulting oil filtered (to remove NaBr catalyst) to give 33.8 g. of the desired product. Quantitative infrared analysis indicates the product has a free isocyanate content of 5.1 meq./g. and confirms the presence of isocyanurate groups.

What is claimed is:
1. A process for the preparation of polyisocyanate compounds containing isocyanurate rings comprising
    (a) reacting a mono-(lower alkyl) substituted benzene compound with aliphatic aldehyde and hydrogen chloride in the presence of Lewis acid or Friedel-Crafts catalyst to produce a first reaction mixture of poly(chloroalkylated) lower alkyl-substituted benzene compounds,
    (b) forming a second reaction mixture comprising said first reaction mixture of the poly(chloroalkylated) benzene compounds together with the cyanate of a metal selected from the group consisting of Li, Na, K, Rb, Cs, Be, Mg, Ca in the conjoint presence of a bromide or iodide of an alkali metal or alkaline earth metal, and in the presence of an aprotic solvent which is liquid under the conditions of the reaction, which has a dielectric constant greater than about 15 at 25° C., which is dipolar so that one part of the molecule has a more positive electrical charge relative to the other parts of the molecule causing the molecule to act as a dipole, which is sufficiently inert not to enter into deleterious side reactions to a significant degree under reaction conditions and which does not possess hydrogen atoms capable of hydrogen bonding with or transferring to anions in solution in the reaction mixture, or mixtures of such aprotic solvents, wherein the reaction is conducted at temperatures of from about 25 to about 300° C. and wherein the mole ratio of metal cyanate to the chloride in the poly(chloroalkylated) benzene compounds is from about 0.8 to about 1.5.

2. The process of claim 1 wherein the mixture of poly(chloroalkylated) mono (lower alkyl-substituted) benzene compounds formed in (a) is formed without substantial purification of the mixture.

3. The process of claim 1 wherein the aprotic solvent is selected from the group consisting of N-alkylpyrrolidones, dialkyl formamides, acetonitrile, hexa-alkylphosphoramides, tetra-alkyl ureas, dialkyl sulfoxides, and dialkyl sulfones.

4. The process of claim 3 wherein the aprotic solvent comprises a major portion of N-dimethylformamide.

5. The process of claim 1 wherein from about 0.05 to about 50 liters of solvent are present per mole of chloroalkyl group in the poly(chloroalkylated) mono (lower alkyl-substituted) benzene compound starting material.

6. The process of claim 1 wherein the poly(chloroalkylated) mono (lower alkyl-substituted) benzene organic starting material is poly(chloromethylated) toluene.

7. The process of claim 1 wherein the mixture of poly(chloroalkylated) mono (lower alkyl-substituted) benzenes comprises a mixture of chloromethylated mono lower alkyl-substituted benzenes wherein the average number of chloromethyl groups per molecule is greater than about 2.0.

8. The process of claim 1 wherein the poly(chloroalkylated) mono lower alkyl-substituted benzene is obtained as a result of the chloromethylation of a compound selected from the group consisting of toluene, ethyl benzene and cumene.

9. The process of claim 1 wherein the metal cyanate is sodium cyanate.

10. Mixtures of organic polyisocyanates containing at least 0.5 milliequivalent of —NCO groups per gram of product mixture and having from about 0.1 to about 75 mole percent isocyanurate groups based on the total moles of nitrogen in the mixture, and from about 1 to about 25 mole percent of bis(substituted diphenyl methane) where the substituents are selected from the lower alkyl and halogen groups based on the total number of moles of aromatic groups in the product made in accordance with the process of claim 7.

11. Mixtures of organic polyisocyanates containing at least 0.5 milliequivalent of —NCO groups per gram of product mixture and having from about 0.1 to about 75 mole percent isocyanurate groups based on the total moles of nitrogen in the mixture and from about 1 to about 25 mole percent of bis-methane (substituted diphenyl) groups based on the total number of moles of aromatic groups in the product made in accordance with the process of claim 8.

References Cited
UNITED STATES PATENTS 3,458,448    7/1969    Argabright et al. _____ 252—182

HOSEA E. TAYLOR, Primary Examiner

H. S. COCKERAM, Assistant Examiner

U.S. Cl. X.R.

260—2.5 AW, 248 NS